April 8, 1958 J. H. WILSON 2,829,620
SPEED CHANGE INDICATOR FOR USE WITH WEIGHT INDICATOR
Filed Feb. 8, 1956 3 Sheets-Sheet 1
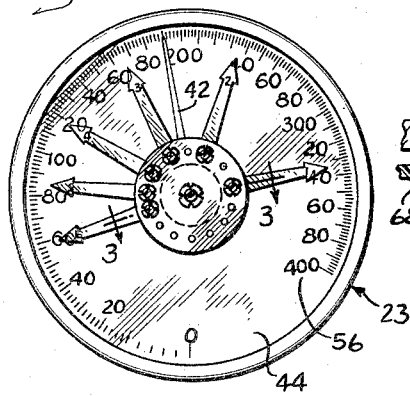
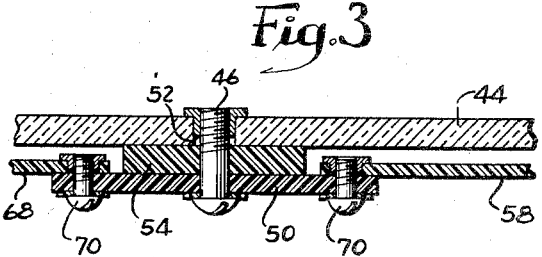
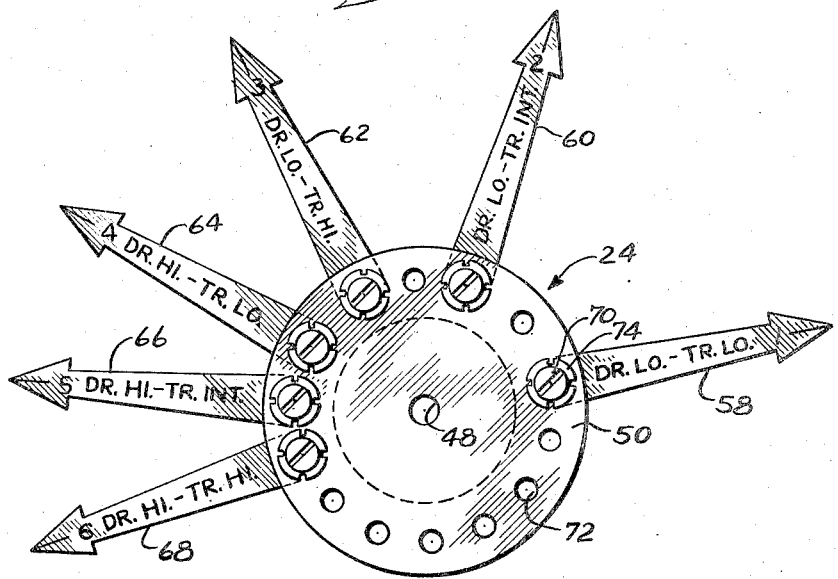
INVENTOR.
JOHN HART WILSON
BY
Watson, Cole, Grindle & Watson
Attys.

April 8, 1958  J. H. WILSON  2,829,620
SPEED CHANGE INDICATOR FOR USE WITH WEIGHT INDICATOR
Filed Feb. 8, 1956  3 Sheets-Sheet 2
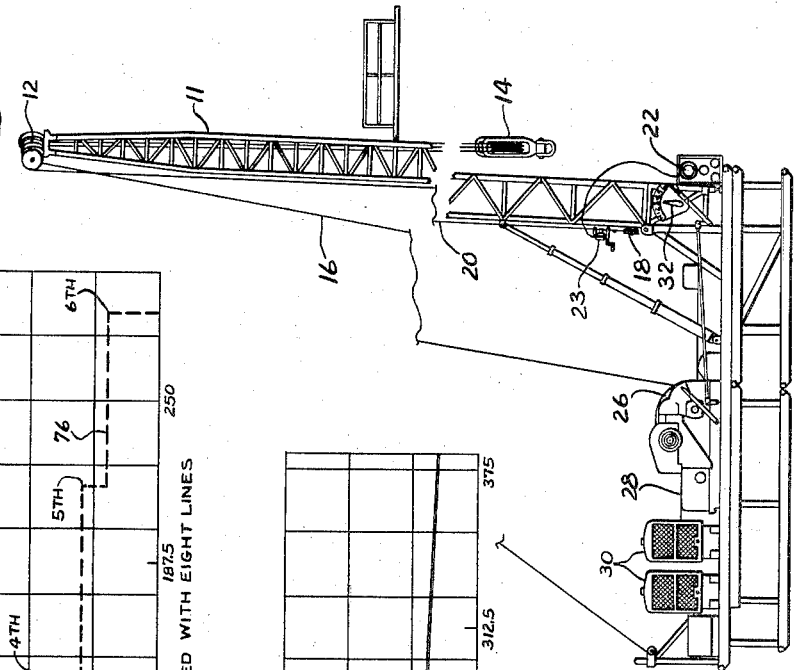
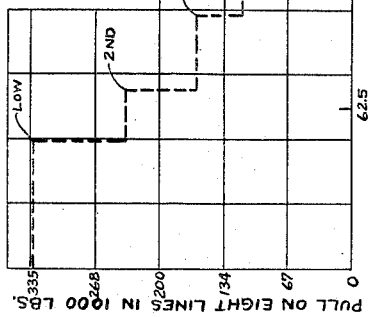
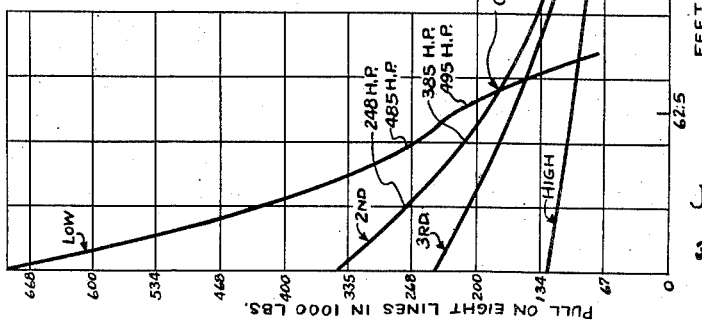
INVENTOR.
JOHN HART WILSON April 8, 1958  J. H. WILSON  2,829,620
SPEED CHANGE INDICATOR FOR USE WITH WEIGHT INDICATOR
Filed Feb. 8, 1956  3 Sheets-Sheet 3
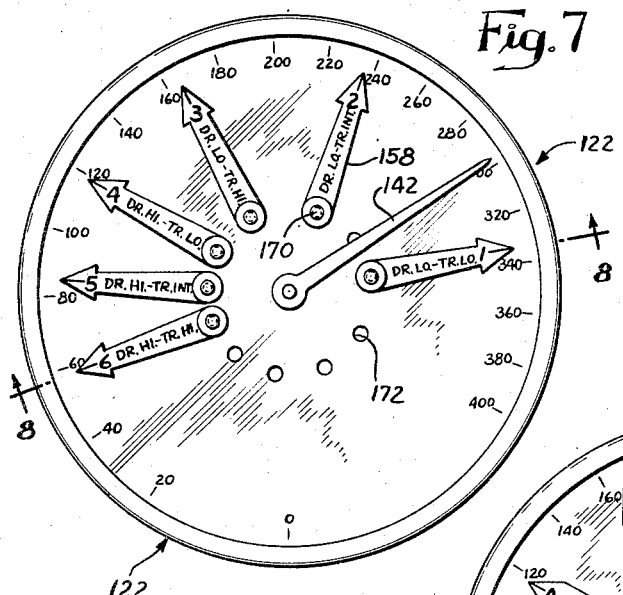
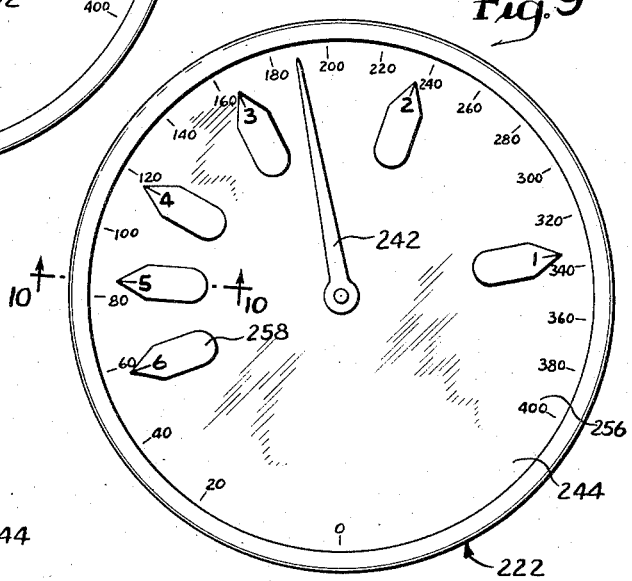
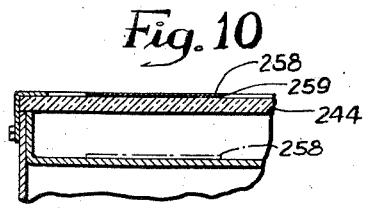
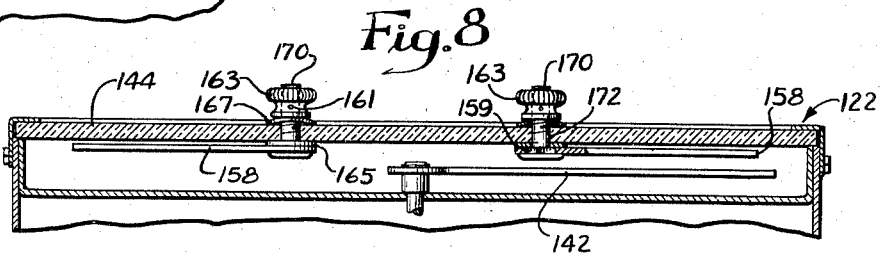
INVENTOR.
JOHN HART WILSON

United States Patent Office 2,829,620
Patented Apr. 8, 1958

2,829,620

SPEED CHANGE INDICATOR FOR USE WITH WEIGHT INDICATOR

John Hart Wilson, Wichita Falls, Tex.

Application February 8, 1956, Serial No. 564,336

5 Claims. (Cl. 116—129)

This invention relates to a new and novel device which indicates when to change gears on a drilling rig.

Heretofore, it has been the practice to shift the gears on a drilling rig transmission by guess, when removing drill stem, or pipe from the bore hole of a well by means of a sheave block and cable arrangement connected to power hoisting drums, such drums usually being powered by an internal combustion engine or the like, through a transmission, which transmission usually has as many as six speed changes.

The present invention is so designed, and the ratings of the engine and transmission so calculated, that the transmission may be shifted to a different gear at the proper time, in accordance with the weight indicated by the weight indicator. The present device is constructed with a plurality of movable indicator pointers, which pointers may be so adjusted with respect to the pulling capacities of each gear, as to enable the most efficient use thereof, both as to speed and power. The entire range of gearing may be used to the fullest efficiency, which will equal or exceed the efficiency of torque converters and the like, which are now in common use.

An object of this invention is to provide a speed shift indicator for the transmission of a drilling rig, which will be in direct reading relation, at all times, with a weight indicator pointer.

Another object of the invention is to provide a speed change indicator for the transmission of a drilling rig, which may be readily adjusted to indicate the shifting of the gears to a higher or to a lower gear, to suit the particular transmission and power of the engine in accordance with a predetermined rating figured for a particular job, or determined by test.

A further object of this invention is to provide a speed change indicator for the transmission of a rotary drilling rig or the like, which can be set by tests, and when once set, can be used to tell when the engines will not pull their full power and should be adjusted or repaired.

Yet a further object of the invention is to provide a speed change indicator for the transmission of a rotary drilling rig or the like, which speed indicator may be readily attached to a weight indicator in superposed relation so that the weight indicator and the speed change indicator may be read simultaneously, and without the need of making any mathematical calculations.

A still further object of the invention is to provide a speed change indicator for the transmission of a rotary drilling rig, or the like, the indicator pointers of which may be of transparent material, such as plastic, glass or the like, and which device may be readily attached to the cover glass or crystal of a weight indicator in such manner as not to interfere with the ready reading of the weight indicator, and regardless of the position of the weight indicator hand.

Still another object of the invention is to provide a speed change indicator for the transmission of a drilling rig or the like, the pointers of which may be numbered, and which may be readily removed and replaced, to enable the ready setting of the pointers to the particular weight at which the speed of the transmission is to be changed.

A still further object of the invention is to provide a speed change indicator for the transmission of a drilling rig or the like, which is simple in construction, easy to attach to or to detach from a weight indicator, and which is easy to set or adjust, and which is low in the cost of manufacture.

With these objects in mind and others which will become manifest as the description proceeds, reference is to be had to the accompanying drawings, in which like reference characters designate like parts in the several views thereof, in which:

Fig. 1 is an elevational view of the device embodying one form of the present invention, which is shown as attached to a weight indicator.

Fig. 2 is a front elevational view of the speed change indicator for a transmission, shown apart from the weight indicator;

Fig. 3 is an enlarged fragmentary sectional view taken on the line 3—3 of Fig. 1, looking in the direction indicated by the arrows;

Fig. 4 is a schematic elevational view showing a derrick or mast, a sheave and cable block arrangement, a weight indicator, a hoisting drum, a transmission shift lever, and an engine for driving the hoisting drum through the transmission;

Fig. 5 is a speed pull curve showing the single line pull in thousand pounds of the hoist and the speed at which this load can be hoisted on a rig equipped with a six speed transmission, but without torque converters, showing the proper speed change points to obtain maximum efficiency;

Fig. 6 is a speed pull curve showing the single line pull in thousand pounds of the hoist, and the speed at which this load can be hoisted on a rig equipped with a four speed transmission and torque converters, showing the proper speed change points to obtain maximum efficiency;

Fig. 7 is an elevational view of a modified form of the invention, wherein the speed change indicator pointers are mounted directly on the transparent cover of the weight indicator;

Fig. 8 is a sectional view taken on the line 8—8 of Fig. 7, looking in the direction indicated by the arrows;

Fig. 9 is an elevational view of a further modified form of the device showing the speed change indicator pointers attached to the transparent cover of the weight indicator by a permanently tacky, pressure sensitive adhesive; and Fig. 10 is a fragmentary sectional view taken on the line 10—10 of Fig. 9, looking in the direction indicated by the arrows.

With more detailed reference to the drawings, the numeral 11 designates a derrick of a drilling rig, which derrick has crown block sheaves 12, traveling block 14, a cable 16, one end of which is a "dead line" or load sustaining element, indicated at 20 and is connected to an anchor 18. The weight indicator sensing element 23 attaches to the "dead line" 20 of the cable, as indicated in Fig. 4. The speed change indicator for a transmission of a drilling rig or the like, is indicated generally by the numeral 24. One end of the cable passes over a drum 26 of the drilling rig, and is attached to the weight indicator designated generally at 22. The cable 16 spools onto the drum 26 in a manner well understood in the art of drilling.

The drum 26 is connected in driving relation with the engines 30 through a transmission 28 by a suitable transmission means, which transmission means is of the speed change type to enable selectively connecting the engines 30 to the drum 26 in the desired speed relation, as by gears, sprockets or the like, which gears are selectively controlled by a speed selector lever indicated at 32. The speed selector lever 32 is mounted on the drilling rig adjacent the drillers position, to enable the gears of the transmission to be shifted to obtain the desired speed.

The weight indicator, designated by the numeral 22, has an indicator hand 42 which is responsive, through sensing element 23, to the pull exerted on "dead line" cable 20, such weight indicators being well known in the art, and may be of various designs. However, a weight indicator usually has a transparent glass or plastic cover, such as indicated at 44. It is preferable to attach the speed change indicator, such as shown in Figs. 1 to 3, inclusive, and designated at 24, to the cover 44 by means of a central bolt 46 which passes through an aperture 48 of a central disc 50 of the speed change indicator, and through a hole 52, which may be drilled in the cover 44 of the weight indicator, or if desired, a spacer block 54 may be cemented directly to the cover 44, so that the center of the disc 50 coincides substantially with the axis of the weight indicator hand 42.

Weight indicators are made to indicate various weight pulls on cables, and the dial of the weight indicator is calibrated for the particular multiple cable arrangement being used, that is, the number of lines strung up, so that the hand will read directly on the dial which is calibrated in points to indicate thousands of pounds pull, as indicated by the numeral 56. The present dial is calibrated to read from zero to four hundred thousand pounds hook load of the block.

For purposes of illustration, a graph is shown in Fig. 5, of the hook load on an eight line string up, and the speed changes so indicated on the graph, so as to enable the setting of the pointers 58, 60, 62, 64, 66, and 68 of the speed change indicator for the transmission of the drilling rig, so that, when hoisting the pipe, as the weight indicator pointer passes under the speed change pointer, the operator should shift to the speed shown on the speed change pointer, which will be a higher speed.

When lowering the pipe into the hole, as the weight indicator hand passes under the speed change pointer, the operator should shift to the next lower speed, to pick up the pipe to release the slips. Then the pipe is lowered by the brake, and the empty blocks are hoisted, preferably in the highest speed. This enables the drilling rig to more efficiently handle the load without strain on the equipment, and at the same time handle the load with the greatest possible speed for the particular amount of weight being handled, and the speed changed exactly when it should be.

The pointers 58 through 68, on the speed change indicator, are each pivotally mounted on a screw threaded bolt 70 for pivotal movement within a predetermined arc, so as to enable the setting of the pointers in accordance with a pre-calculated chart, or by actual test, which will enable the shifting of the transmission gears at the proper time so as to give the correct load to be handled at all times, thereby effecting fuel savings and reducing substantially the wear on the mechanism by running it at the proper speed.

The disc 50 has circumferentially spaced holes 72 formed therein to allow the fitting of a bolt 70 in each of the selected holes, so that the speed change indicator pointers 58 through 68, having indicia thereon to represent the particular gear at which the transmission is to be shifted, may be positioned in the particular hole nearest the rated capacity in that speed. A cup-type spring washer 74 is positioned intermediate each bolt 70 and the disc 50, so as to provide a tension on the bolt, which tension is transferred to the respective pointers, indicated at 50 to 68, inclusive, so that the particular pointer will remain in set position until manually reset in accordance with a new, predetermined, calculated setting. Or, the setting may be determined by actual test in which is determined the maximum weight that can be lifted in that speed with a given number of lines and a given number of engines, without causing undue strain on the engines, The chart, as indicated in Fig. 5, shows a six speed non-torque converter curve designated at 76 in dashed outline. It is to be noted that this calculation is based upon a transmission for lifting loads upward to four hundred thousand pounds on eight lines, and which utilizes about six hundred horsepower. The dashed outline indicates the pulling capacity in a given speed delivered by the engine to hoist the pipe. Therefore, with the present speed change indicator arrangement, the smoothness of torque converter power can be approached with a positive driving relation at all times, with the drum, without the power loss accorded by the "slip" present in all torque converters.

As an example of the importance of changing speeds at the proper time, even with torque converters, reference is had to Fig. 6, which is an actual pulling capacity curve of a rig with six hundred horsepower of engines, and a four speed transmission, and torque converters. Since the vertical scale is in 1000 pounds pull on eight lines, and the horizontal scale is block speed in feet per minute, any point on any of these curves represents a certain horsepower, and the product of the pounds pull times the line speed divided by 33,000 equals the horsepower at that point.

For example, where the second speed curve crosses the 200 feet per minute line, the pull is 41,000 pounds, and 41,000 times 200, divided by 33,000 equals 248 horsepower. But if the rig had pulled the same load in "low speed" the line speed would be 390 feet per minute and the delivered horsepower would be 485, or 237 horsepower more, that is 95% more.

The graphs, as indicated in Figs. 5 and 6, clearly disclose the effectiveness of positive driven gear elements, if the transmission is shifted to the proper gear at the proper time, to perform the lifting load, and by combining the speed change indicator for transmissions of drilling rigs with the weight indicator, the proper shifting of the gear is readily apparent to the driller, thereby making possible the use of the power delivered by the engine to the fullest extent.

By utilizing the weight indicator in the shifting to the speeds as the weight indicator hand passes under the particular pointer on the weight indicator, and if the engine does not respond to the pulling of the load with the same effectiveness as it did at the original setting of the weight indicator pointer, it will indicate that the effectiveness of the engine has decreased and that the engine needs to be adjusted or overhauled to bring its performance back to its original condition. This applies to all forms of the invention shown and described herein.

*Modified form of invention*

The form of the invention, as shown in Figs. 7 and 8, has the weight indicator designated generally by the numeral 122, which weight indicator is similar to the weight indicator shown in Figs. 1 and 4, and is connected with a sensing element such as indicated at 23 in Fig. 4, however, the weight indicator 122 has a transparent cover or crystal 144, which has a series of holes 172 formed around the axis 148 of the weight indicator 122. A bolt or screw 170 is fitted through a non-circular aperture formed in each of the pointers 158, which bolt has a non-circular portion 159 to complementarily engage the non-circular aperture in each of the pointers 158, so that the respective bolts 170 and pointers 158 will rotate in unison. A pin 161 is provided through a thumb knob 163, so upon turning thumb knob 163, the pointer 158 may be moved about an arc with the bolt 170 as an axis. A thrust bearing washer 165 is positioned intermediate the inner surface of transparent cover 144 and the adjacent surface of pointer 158. A cupped spring washer 167 is provided intermediate the outer surface of transparent cover 144 and the inner side of thumb knob 163. In this manner, each of the respective pointers 158 may be manually manipulated from the exterior of the transparent cover, so as to give the desired setting of the respective pointers 158, beneath the transparent cover 144. Holes 172 are circumferentially spaced around the axis 148 of weight indicator hand 142, so as to enable the correct positioning of the pointers 158 within the range of which the pointers will normally operate.

The form of the invention, as shown in Figs. 7 and 8 is adapted to perform the same functions as the form of the device shown in Figs. 1 to 5, and described above.

*A further modified form of invention*

A further modified form of the invention is shown in Figs. 9 and 10, wherein the weight indicator is indicated generally at 222 and has a hand 242 operatively connected with a sensing element, such as shown at 23 in Fig. 4. The weight indicator may be of the same general character as shown in Figs. 1 through 4, however, the speed change indicator pointers, as indicated at 258 are made of transparent material, such as plastic or the like, and have one surface thereof, as indicated at 259, coated with permanently tacky, pressure sensitive adhesive, which will readily adhere to the transparent cover 244 of the weight indicator 222.

The transparent pointers 258 may either be made of rigid or flexible material and may be placed upon the surface of transparent cover 244 of the weight indicator, or directly upon the surface of the dial on which the indicia 256 is imprinted. When it is desired to change the lines or the engines, the pointers may be readily reapplied at the desired point on the transparent cover or dial, without altering the weight indicator in any manner. It is to be understood that one of the advantages of positioning the speed change indicator pointers 258 on the transparent cover or dial, it shows the time at which to change speeds in relation to the weight indicator hand 242, as to the shifting of gears, that is the same in this form of the invention as in the forms described above.

While the invention has been illustrated and described in the various forms thereof, it is to be understood that changes may be made in the minor details of construction and adaptations made to different installations, without departing from the spirit of the invention or the scope of the appended claims.

Having thus clearly shown and described the invention, what is claimed as new and desired to secure by Letters Patent is:

1. In a speed change indicating device for use with a weight indicator of a rotary drilling rig, which rotary drilling rig has a hoist line and a load sustaining element, said weight indicator being operably attached to said load sustaining element, said weight indicator having a movable hand to indicate the weight sustained by said load sustaining element, and a plurality of speed change indicators mounted in a common plane and in close relative reading relation to a plane in which said movable hand swings, which indicators are positioned intermediate the minimum pull and the maximum pull registerable on said weight indicator.

2. In a speed change indicator device for use with a weight indicator of a rotary drilling rig, which rotary drilling rig has a hoist line and a load sustaining element, said weight indicator having a transparent cover and a movable hand to indicate the weight sustained by said load sustaining element, a plurality of speed change indicating pointers mounted in a common plane and in close relative reading relation to a plane in which said movable hand swings, which indicators are positioned intermediate the minimum pull and the maximum pull registerable on said weight indicator, said speed change indicating device having a pointer for each speed of the transmission of the drilling rig.

3. The device substantially as defined in claim 2, wherein, said speed change pointers are pivotally mounted with respect to said weight indicator, and have control knob means interconnected with each pointer for selectively moving said speed change pointers.

4. The device as defined in claim 2, wherein said transparent cover of said weight indicator has a plurality of circumferentially spaced holes formed therein a spaced distance from the axis of said hand of said weight indicator, said speed change pointers being fitted interior of said transparent cover, pivot means secured to the respective pointers and passing through certain of said holes to a point exterior of said transparent cover, and means secured to the exterior of said pivot means by which to rotate said pivot means and said pointer connected to the inner side of said transparent cover.

5. In a speed change indicator attachment, a weight indicator, a transparent disc, which disc has circumferentially spaced holes formed therein, a multiplicity of pointer members each having an end thereof apertured, pivot means passing through said aperture, the respective pointer members and pivot means being fixedly secured to each other, said pivot means passing through said holes in said disc and being relatively movable, and means for securing said disc to the outer face of said weight indicator, with at least one speed change pointer member for each transmission speed of the transmission of a drilling rig.

References Cited in the file of this patent

UNITED STATES PATENTS

| | | |
|---|---|---|
| 2,393,053 | Moore | Jan. 15, 1946 |
| 2,715,165 | Matter | Aug. 9, 1955 |
| 2,718,113 | Bramwell | Sept. 20, 1955 |

FOREIGN PATENTS

| | | |
|---|---|---|
| 201,093 | Great Britain | July 23, 1923 |